United States Patent [19]

Chen et al.

[11] Patent Number: 4,671,676
[45] Date of Patent: Jun. 9, 1987

[54] HYDROSTATIC BEARING

[75] Inventors: Wei-Chung Chen, Thousand Oaks; Eugene D. Jackson, Canoga Park, both of Calif.

[73] Assignee: Rockwell International Corporation, El Segundo, Calif.

[21] Appl. No.: 771,731

[22] Filed: Sep. 3, 1985

[51] Int. Cl.⁴ ............................ F16C 32/06; F16C 33/10
[52] U.S. Cl. ..................................... 384/100; 384/114; 384/118; 384/292
[58] Field of Search .................. 384/100, 99, 107–120, 384/283–293, 398, 400

[56] References Cited

U.S. PATENT DOCUMENTS

| | | | |
|---|---|---|---|
| 3,101,224 | 8/1963 | Adams | 384/120 |
| 3,517,973 | 6/1970 | Hirs | 384/115 |
| 3,650,580 | 3/1972 | Beisemann | 308/9 |
| 3,767,277 | 10/1973 | Woolcock | 308/9 |
| 3,941,434 | 3/1976 | Schurger et al. | 308/9 |
| 3,945,692 | 3/1976 | Tsujiuchi | 308/9 |
| 4,120,544 | 10/1978 | Hüber | 384/292 |
| 4,175,799 | 11/1979 | Davis et al. | 308/9 |

FOREIGN PATENT DOCUMENTS

| | | | |
|---|---|---|---|
| 14160 | 2/1977 | Japan | 384/117 |
| 180831 | 10/1983 | Japan | 384/109 |
| 582419 | 11/1977 | U.S.S.R. | 384/100 |

OTHER PUBLICATIONS vonPragenau, George L., "Damping Seals for Turbomachinery", *NASA Technical Paper* 1987, (1982).
Reddecliff, J. M. and Vohr, J. H., "Hydrostatic Bearings for Cryogenic Rocket Engine Turbopumps", *Journal of Lubrication Technology*, Jul. 1969, pp. 557–575.
Hirs, G. G., "A Bulk-Flow Theory for Turbulence in Lubricant Films", *Journal of Lubrication Technology*, Apr. 1973, pp. 137–141.

*Primary Examiner*—Stuart S. Levy
*Assistant Examiner*—Thomas R. Hannon
*Attorney, Agent, or Firm*—H. Fredrick Hamann; Harry B. Field; Lawrence N. Ginsberg

[57] ABSTRACT

A hydrostatic bearing 20 for a rotatable shaft 18 of the type in which lubricating fluid is fed through orifices 12 in the bearing to a plurality of recesses 14 and finally to a land 16. Land 16 comprises grooves 22 directed toward recesses 14 in the direction of the shaft's rotation so that lubricating fluid is pumped back toward recesses 14.

11 Claims, 8 Drawing Figures

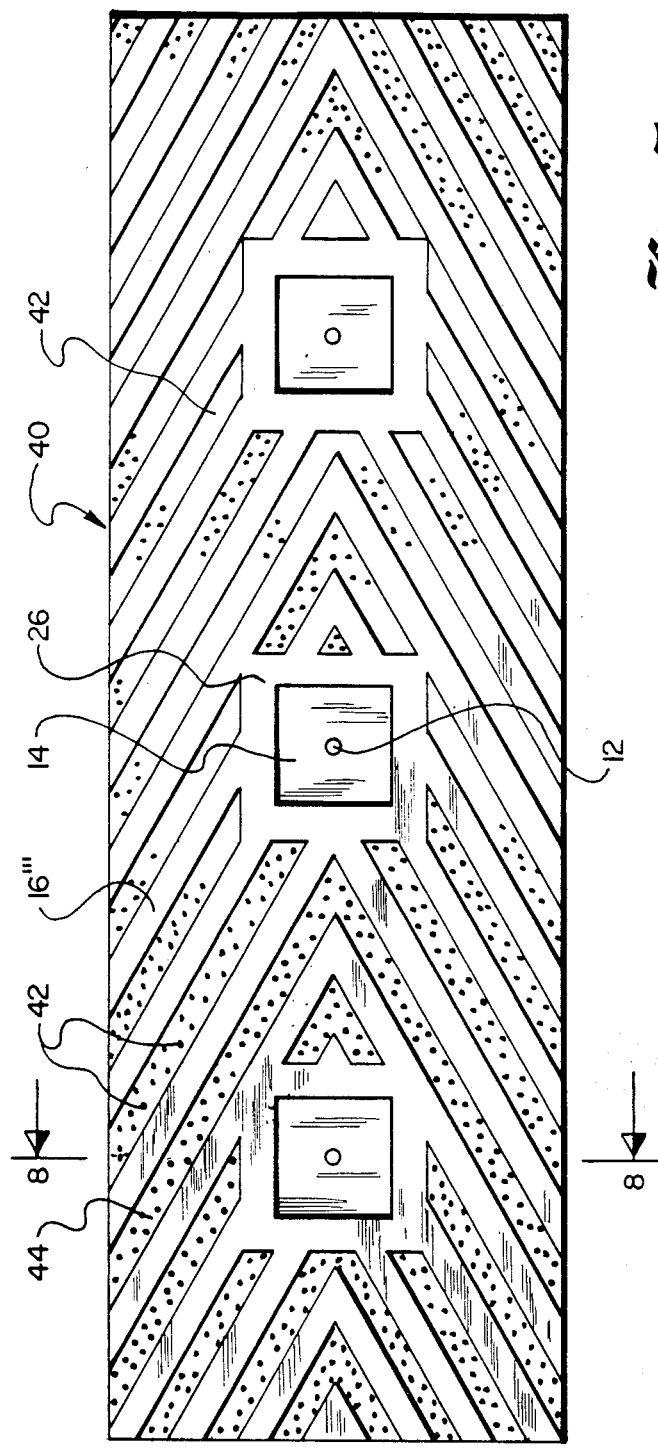
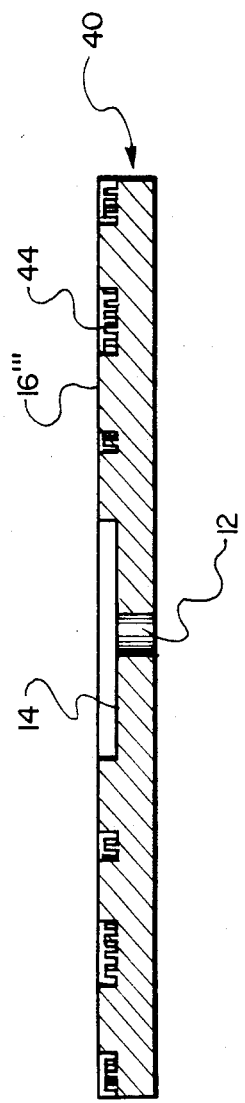

HYDROSTATIC BEARING

BACKGROUND OF THE INVENTION

1. Field of the Invention

The present invention is directed to an improved hydrostatic bearing for a rotatable shaft and more specifically, to a hydrostatic bearing with improved means for stabilizing the shaft and for reducing the lubricating fluid leakage flow rate from the hydrostatic bearing.

2. Description of the Prior Art

The performance of rocket engines utilizing liquid propellants is related to the efficiency of the propellant tubopumps. Turbopump efficiency is frequently dependent on its operating speed; however, an optimum speed is sometimes difficult to realize if rolling ball element bearings are used. Operating speeds in some cases are limited below the point of maximum efficiency by the life-limiting relationship of rolling element bearing DN (diameter × rotative speed) and less frequently by rotor critical speed. Substitution of hydrostatic bearings for rolling element bearings provides a solution to this problem because hydrostatic bearings have no DN limit and the rotor can be sized for critical speed margin without regard to bearing DN. An increased operating speed also reduce turbopump size and weight.

Conventional hydrostatic bearings utilize a number of feeding recesses for lubricating fluid, along the circumference of the bearing. (See "Hydrostatic Bearings for Cryogenic Rocket Engine Turbopumps" by J. M. Reddecliff and J. H. Vohr, Journal of Lubrication Technology, July 1969.) The feeding recesses provide pockets for lubricating fluid, allowing the build up of more effective hydrostatic pressure and interrupting circumferential flow of lubricating fluid, thus helping to stabilize the shaft. However, at very high speeds stability problems exist and there is often excessive leakage of lubricating fluid from the hydrostatic bearing.

SUMMARY OF THE INVENTION

The present invention provides a method and means for reducing the lubricant leakage flow rate from a hydrostatic bearing and for increasing the stability of a shaft. In each embodiment lubricating fluid is fed from a manifold exteriorly of the bearing, through a plurality of orifices in the bearing, to a plurality of recesses on an inner surface of the bearing, and finally to a land on the inner surface. The recesses provide pockets of lubricating fluid to allow the build-up of more effective hydrostatic pressure.

In a first embodiment, grooves on the bearing surface act to pump lubricating fluid back toward the recesses during rotation of the shaft, interrupt lubricant flow along the circumference of the bearing, and interrupt lubricant flow transverse to the circumference of the bearing, thus stabilizing the shaft and reducing the lubricant leakage rate.

In a second embodiment, a roughened bearing surface is utilized to interrupt lubricant flow for greater stability and a reduced lubricant leakage rate.

In a third embodiment, the grooved surface of the first embodiment is roughened to take advantage of a roughened surface's lubricant flow inhibiting characteristics.

OBJECTS OF THE INVENTION

A principal object of the present invention is, therefore, to provide an improved method and means for maximizing the stability of a rotatable shaft.

Another object is to provide a method and means for minimizing the leakage flow rate from a hydrostatic bearing.

Other objects, advantages and novel features of the present invention will become apparent from the following detailed description of the invention when considered in conjunction with the accompanying drawing.

BRIEF DESCRIPTION OF THE DRAWINGS

FIG. 7 is a schematic illustration of the grooved and roughened inner surface of the third embodiment of the improved hydrostatic bearing projected on a flat surface.

FIG. 8 is a cut-away cross-section taken along line 8—8 in FIG. 7.

The same elements or parts throughout the figures of the drawing are designated by the same reference characters, while equivalent elements bear a prime designation.

DETAILED DESCRIPTION OF THE PREFERRED EMBODIMENT

In general, the fluid in a hydrostatic bearing produces forces $F_x$ and $F_y$ on the bearing surface which can be described in matrix form as:

$$\begin{Bmatrix} F_x \\ F_y \end{Bmatrix} = -\begin{bmatrix} K_{xx} & K_{xy} \\ -K_{yx} & K_{yy} \end{bmatrix} \begin{Bmatrix} x \\ y \end{Bmatrix} - \begin{bmatrix} C_{xx} & C_{xy} \\ -C_{yx} & C_{yy} \end{bmatrix} \begin{Bmatrix} \dot{x} \\ \dot{y} \end{Bmatrix} \quad (1)$$

wherein $K_{xx}$ and $K_{yy}$ are direct stiffness terms, $C_{xx}$ and $C_{yy}$ are direct damping terms, $K_{xy}$, $K_{yx}$, $C_{xy}$, and $C_{yx}$ are destabilizers, x and y are distances on an orthogonal coordinate system, and $\dot{x}$ and $\dot{y}$ are the corresponding velocity terms. The destabilizers are a function of rotation-induced Couette flow. By reducing these destabilizers the direct stiffness and damping become more effective.

Figure 1:
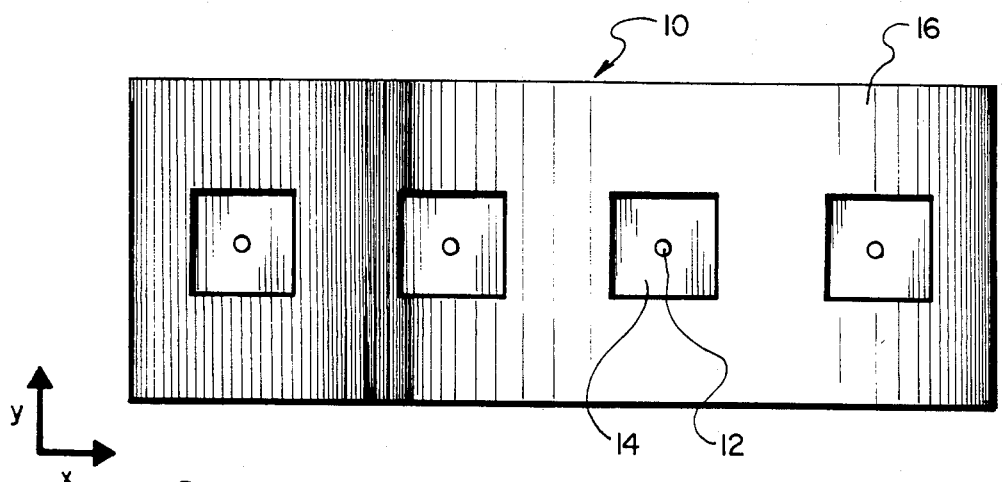
FIG. 1 is a schematic illustration of the inside surface of a conventional hydrostatic bearing shown projected on a flat surface.

The inner surface of a conventional hydrostatic bearing 10 is shown projected on a flat surface in FIG. 1. Lubricating fluid flows from a manifold (not shown), located exteriorly of the bearing 10, through orifices 12, to feeding recesses 14 on the inner surface of the bearing and finally to land 16. As the shaft 18 (FIG. 2) rotates, the circumferential flow is continuously interrupted by recesses 14. Therefore, a larger number of recesses or a longer recess length in the y-direction (see FIG. 1) has a greater effect of eliminating the Couette flow. In addition, the recesses 14, acting as pockets for the lubricating fluid, allow the build-up of more effective hydrostatic pressure. As a result, stiffness and damping are increased and there is greater stability of the shaft. However, the total recess size must be kept as small as possible to prevent the occurrence of pneumatic hammer instability. The compressibility of the lubricating fluid and the inertia of the shaft 18 causes the motion of the shaft to be out of phase with the pressure build-up inside recesses 14. This phase lag results in what is known as a pneumatic hammer, a self-excited vibration occurring within the bearing, creating stability problems.

Figure 2:
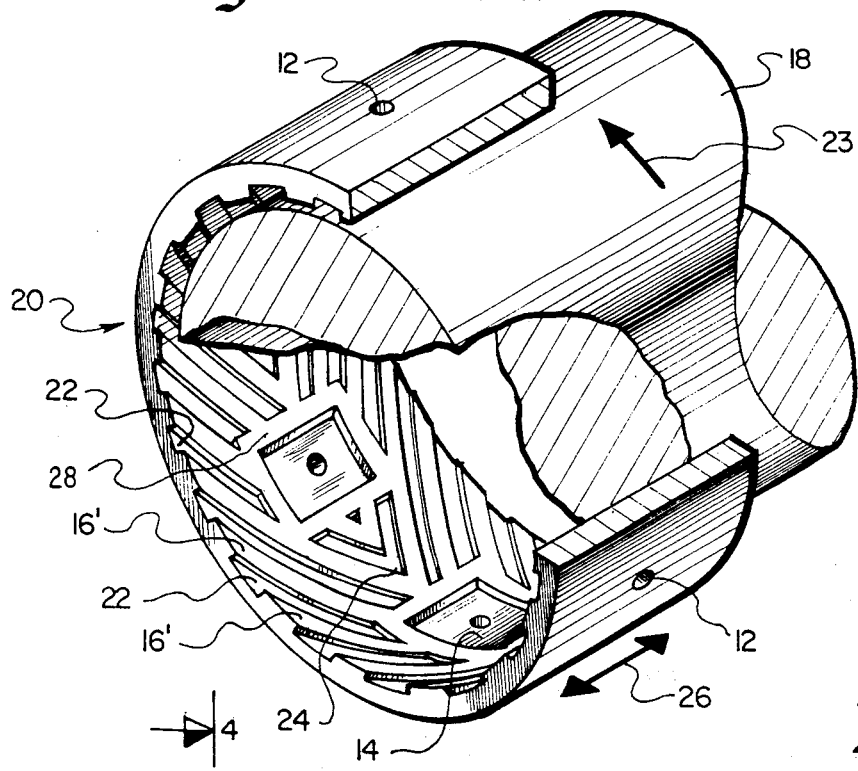
FIG. 2 is a partially cut-away illustration of the grooved inner surface of the first embodiment of the improved hydrostatic bearing with a shaft.
Figure 3:
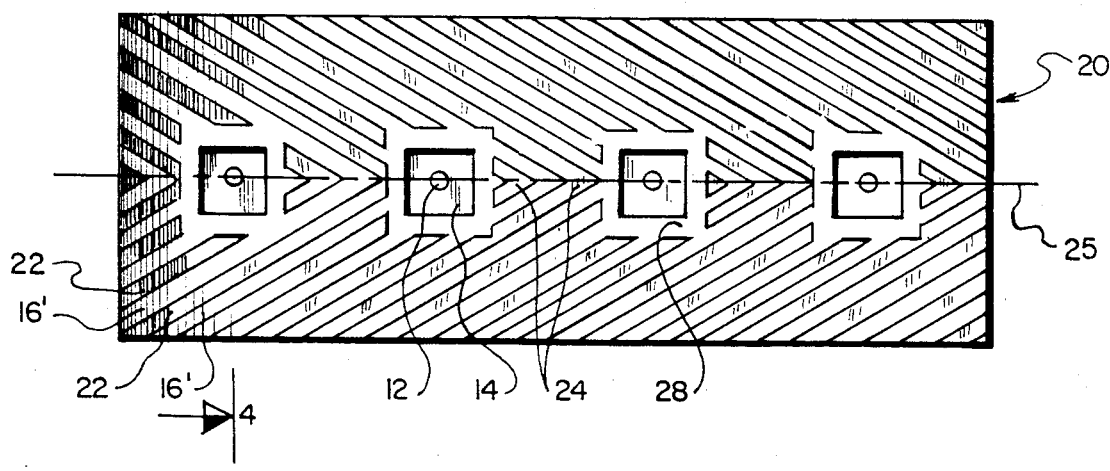
FIG. 3 is a schematic illustration of the grooved inner surface of the first embodiment of the improved hydrostatic bearing projected on a flat surface.
Figure 4:
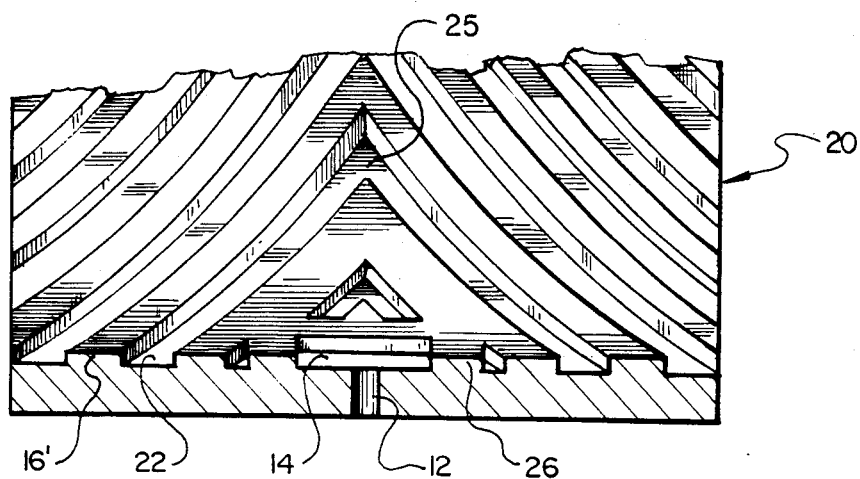
FIG. 4 is a cut-away cross-sectional view of the grooved first embodiment taken along line 4—4 in FIG. 3.
Figure 5:
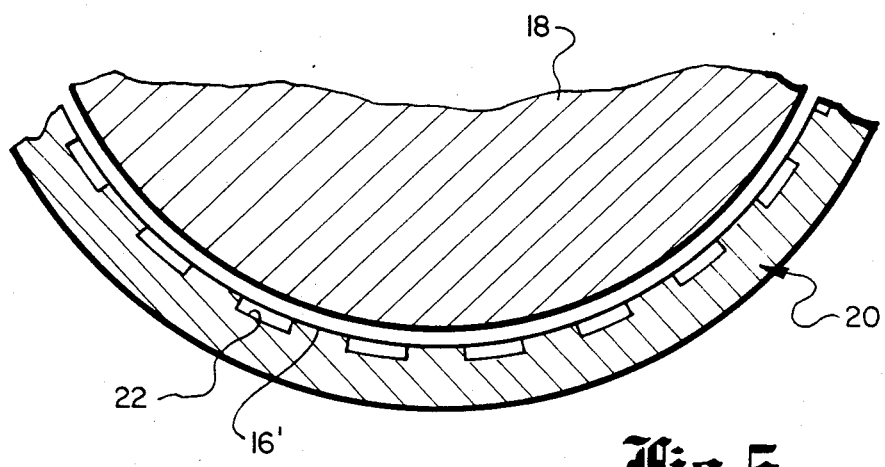
FIG. 5 is a partial cross-sectional view of the grooved first embodiment with a shaft.

A first embodiment of the improved hydrostatic bearing, indicated generally as 20, is shown in relation to shaft 18 in FIG. 2. This first embodiment is shown projected on a flat surface in FIG. 3, in cut-away planar view in FIG. 4, and in partial cross-section in FIG. 5. First embodiment 20 utilizes a plurality of grooves 22 in land 16'. Grooves 22 are directed toward recesses 14 and are oriented to direct lubricant fluid toward recesses 14 as the shaft rotates (see arrow 23, FIG. 2). In this embodiment a single column of recesses 14 is centrally disposed along the bearing surface. The column is perpendicular to the axis of rotation of the shaft. However, it is not necessary that the bearing of the present invention be limited to a single column of recesses. Grooves 22 are v-shaped, having their vertices 24 directed toward the centerline 25 connecting the centers of recesses 14. The vertices 24 are pointed in the intended direction 23 of the shaft's rotation. As a result of being oriented in this manner, grooves 22 work as a pump while the shaft is rotating, directing lubricant fluid back toward recesses 14. In addition, grooves 22 interrupt the flow of lubricating fluid transverse to the inner circumference of the bearing (i.e. arrows 26). Hence, grooves 22 effectively reduce the leakage flow rate from bearing 20. The grooves 22 on each side of centerline 25 are parallel and the angles the grooves form with the centerline are equal to assure dynamic stability.

Grooves 22 also have the added advantage of interrupting circumferential flow of the lubricating fluid. This reduces the Couette flow and increases the stability margin of shaft 18. Use of grooves 22 allows the size of recesses 14 to be kept at a minimum, preventing pneumatic hammer instability problems. By way of example but not limitation, grooves 22 may be on the order of 0.125 inches wide and 0.01 inches deep. Dams 28 having the same height as land 16' are also employed along the perimeter of each recess 14 to further reduce the leakage flow rate.

Figure 6:
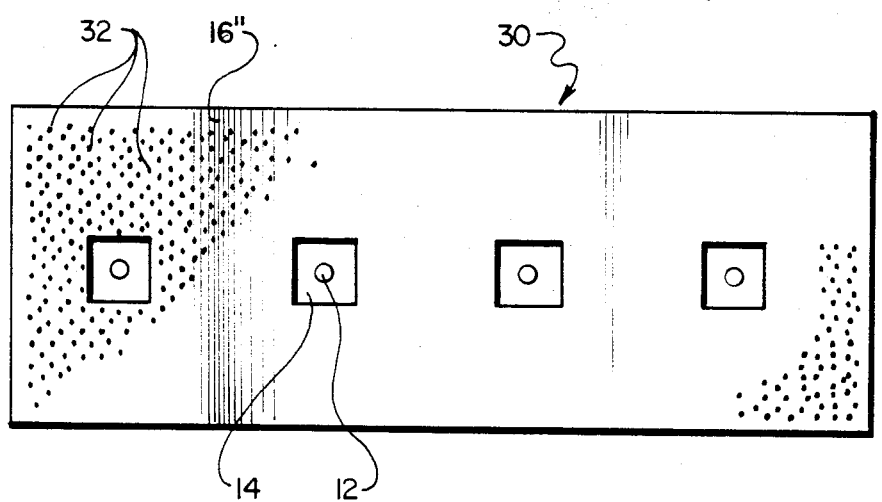
FIG. 6 shows the roughened inner surface of the second embodiment of the improved hydrostatic bearing projected on a flat surface.

A second embodiment of the improved hydrostatic bearing indicated generally as 30 in FIG. 6 employs a plurality of randomly spaced elevations 32 on land 16" which roughen the surface of the land 16". Elevations 32, interrupt circumferential flow of lubricating fluid and interrupt flow of lubricating fluid transverse to the circumference of bearing 30, thus stabilizing the shaft and reducing the leakage flow rate from the bearing. By way of example but not limitation, a surface finish with elevations on the order of 0.0008 inches has been demonstrated to reduce Couette flow by a factor of 2 when compared with the Couette flow of a conventional bearing 10.

A third embodiment of the improved hydrostatic bearing, indicated generally as 40 in FIG. 7, employs a land 16''' with grooves 42, as in the first embodiment. Additionally, grooves 42 have randomly spaced elevations 44, which roughen the surface of the grooves 42. Use of this roughened, grooved surface incorporates the benefits of both prior embodiments, resulting in a greater interruption of circumferential flow of lubricating fluid realizable from either of the prior embodiments. Furthermore, there is a greater interruption of flow transverse to the circumference of the bearing than in any of the prior embodiments. Hence, the stability margin of the shaft is very high, while the leakage flow rate is very low.

All of the above described embodiments have the effect of increasing the critical speed of the shaft, i.e., the threshold velocity for a stable system. The critical speed, $\omega_c$, can be characterized as:

$$\omega_c = \frac{1}{\lambda_c} \sqrt{\frac{K_{xx}}{M}}$$

wherein, $\lambda_c$ is dependent on the magnitude of Couette flow, $K_{xx}$ is a direct stiffness term, and M is the rotor mass. In all the above-described embodiments the Couette flow is minimized and the direct stiffness is maximized; hence, the critical speed is maximized allowing use of the present invention in very high speed applications.

It is noted that although the Figures herein illustrate the improved bearing with one column of recesses 14, it is not necessary that the bearing of the present invention be limited to a single column. In addition, although the shapes of the recesses 14 have been shown to be square, their shape may be rectangular, circular, or irregular, as long as they provide the functions of disrupting circumferential lubricant flow and providing pockets for lubricant for affecting the build-up of more effective hydrostatic pressure.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. An improved hydrostatic bearing for a rotatable shaft of the type in which lubricating fluid is fed from a manifold exteriorly of the bearing, through a plurality of orifices in the bearing to a plurality of recesses on an inner surface of the bearing, and finally to a land on said inner surface, said recesses providing pockets of lubricating fluid to allow the build-up of more effective hydrostatic pressure, wherein the improvement comprises:
   groove means in said land for directing lubricating fluid back toward said recesses, for interrupting the flow of lubricating fluid transverse to an inner circumference of the bearing to thus reduce any leakage flow from the bearing and for interrupting circumferential flow of lubricating fluid, thereby stabilizing the shaft.

2. The improved hydrostatic bearing of claim 1 wherein:
   said recesses are distributed to form at least one column perpendicular to the axis of rotation of said shaft.

3. The improved hydrostatic bearing of claim 2 further comprising:
dams, of substantially the same height of said land, along the perimeter of said recesses for further reducing the leakage flow rate.

4. The improved hydrostatic bearing of claim 1 wherein:
said groove means comprises a plurality of v-shaped grooves having their vertices directed toward a centerline connecting the centers of said recesses, said vertices being pointed in the intended direction of the shaft's rotation.

5. The improved hydrostatic bearing of claim 4 wherein:
the grooves on each side of said centerline are parallel.

6. The improved hydrostatic bearing of claim 5 wherein:
the angle each groove forms with said centerline is equal.

7. An improved hydrostatic bearing for a rotatable shaft of the type in which lubricating fluid is fed from a manifold exteriorly of the bearing through a plurality of orifices in the bearing, to a plurality of recesses on an inner bearing surface, and finally to a land on said inner surface, said recesses providing pockets of lubricating fluid to allow the build-up of more effective hydrostatic pressure, wherein the improvement comprises:
groove means in said land for directing lubricating fluid back toward said recesses, for interrupting the flow of lubricating fluid transverse to an inner circumference of the bearing to reduce any leakage flow from the bearing, and to interrupt circumferential flow of lubricating fluid, thereby stabilizing the shaft; and
a plurality of spaced elevations in said groove means, wherein said elevations roughen the surface of said land, further interrupt circumferential flow of lubricating fluid and further interrupt flow of lubricating fluid transverse to the circumference of the bearing, thereby further stabilizing the shaft and reducing any leakage flow from the bearing.

8. The improved hydrostatic bearing of claim 7 wherein:
said elevations are randomly spaced.

9. An improved method of stabilizing a rotatable shaft, of the type in which lubricating fluid is fed from a manifold exteriorly of a bearing through a plurality of orifices in the bearing, to a plurality of recesses on an inner surface of the bearing and finally to a land on said inner surface, said recesses providing pockets of lubricating fluid to allow the build-up of more effective hydrostatic pressure, wherein the improvement comprises:
directing lubricating fluid back toward said recesses and interrupting the flow of lubricating fluid transverse to an inner circumference of the bearing by means of grooves in said land, thereby reducing the leakage flow rate from the bearing, said groove means also stabilizing the shaft by interrupting circumferential flow of lubricating fluid.

10. The improved method of claim 9 wherein:
said grooves comprise a plurality of v-shaped grooves having their vertices directed toward said recesses, said vertices being pointed in the intended direction of the shaft's rotation.

11. An improved method of stabilizing a rotatable shaft, of the type in which lubricating fluid is fed from a manifold exteriorly of a bearing through a plurality of orifices in the bearing, to a plurality of recesses on an inner surface and finally to a land on said inner surface, said recesses providing pockets of lubricating fluid to allow the build-up of more effective hydrostatic pressure, wherein the improvement comprises:
directing lubricating fluid back toward said recesses and interrupting the flow of lubricating fluid transverse to the circumference of the bearing by means of grooves in said land, thereby reducing the leakage flow rate from the bearing, said groove means also stabilizing the shaft by interrupting circumferential flow of lubricating fluid; and
further interrupting circumferential flow of lubricating fluid and further interrupting flow of lubricating fluid transverse to the circumference of the bearing by means of a plurality of spaced elevations on said grooves thereby further stabilizing the shaft and further reducing the leakage flow rate from the bearing.

* * * * *